Figure 1:
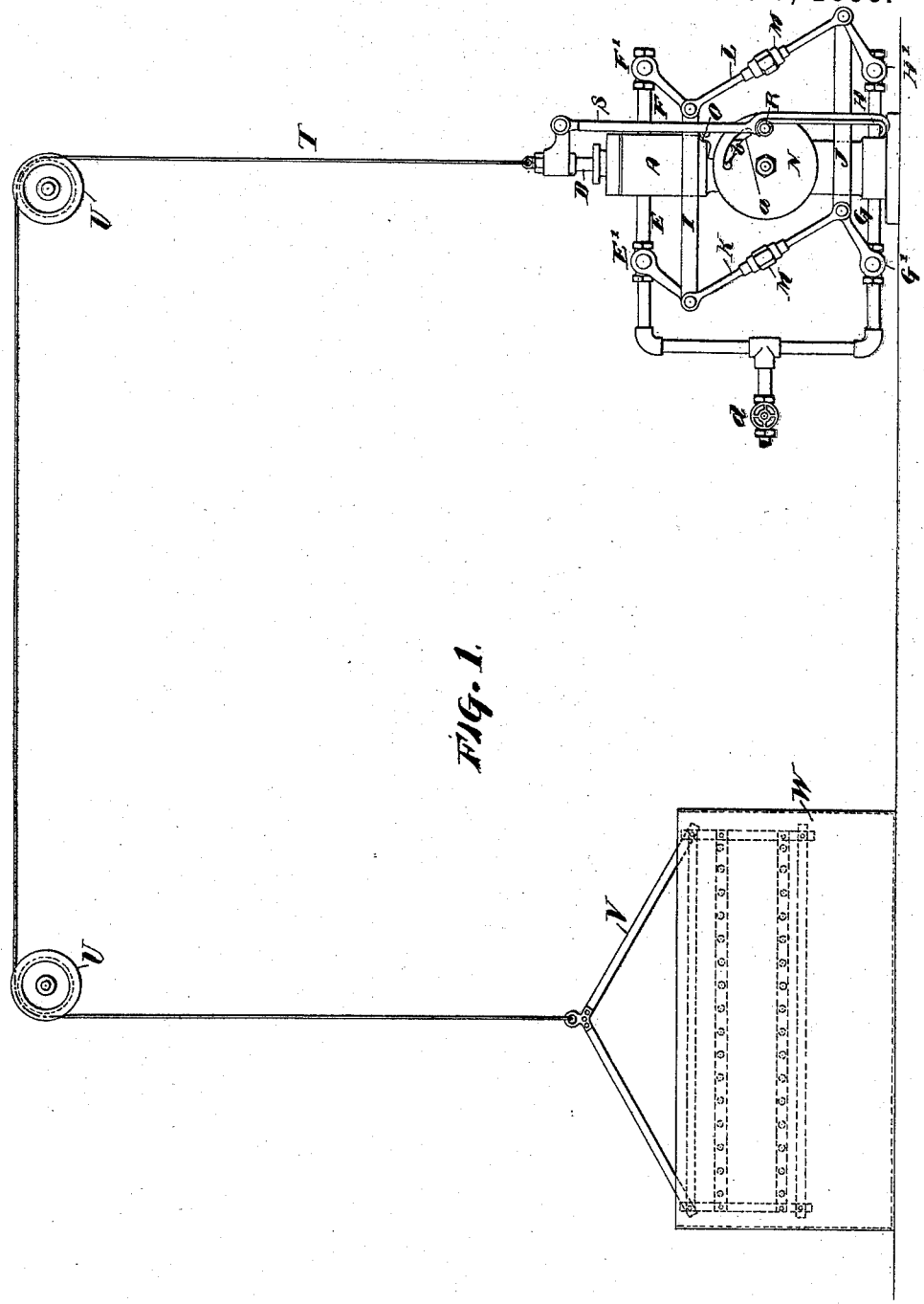

(No Model.) 2 Sheets—Sheet 1.

W. H. LORIMER & J. W. BIRKEY.
ENGINE FOR MOVING YARNS IN VATS.

No. 535,142. Patented Mar. 5, 1895.

WITNESSES:

INVENTORS
William H. Lorimer
John W. Birkey
by their attorney
Chas. A. Rutten

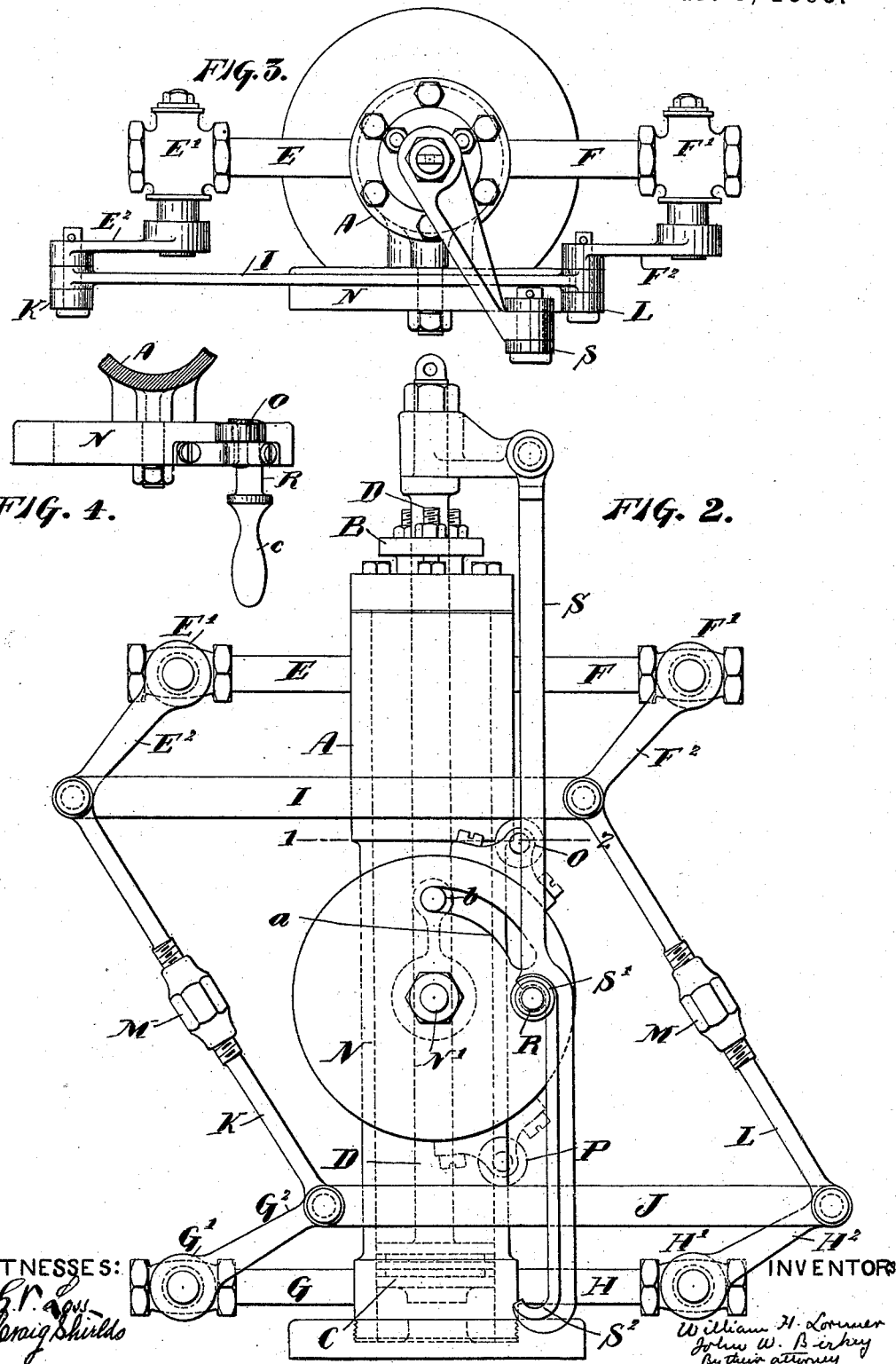

UNITED STATES PATENT OFFICE.

WILLIAM H. LORIMER AND JOHN W. BIRKEY, OF BRISTOL, PENNSYLVANIA.

ENGINE FOR MOVING YARNS IN VATS.

SPECIFICATION forming part of Letters Patent No. 535,142, dated March 5, 1895.

Application filed October 29, 1894. Serial No. 527,153. (No model.)

*To all whom it may concern:*

Be it known that we, WILLIAM H. LORIMER and JOHN W. BIRKEY, citizens of the United States, and residents of Bristol, Bucks county, Pennsylvania, have invented certain new and useful Improvements in Engines for Moving Yarns or other Substances in Vats for Dyeing or Pickling, of which the following is a specification.

Our invention relates to improvements in machinery for dyeing yarns or other substances, and the object of our invention is to furnish an improvement in engines for moving the yarn or other substance in the dye liquid in the kettle or vat so that it will be quickly and evenly dyed throughout.

In the accompanying drawings forming part of this specification and in which similars letters of reference indicate similar parts throughout the several views, Figure 1, is a front elevation of a dyeing kettle, the cage in which the yarn is held, and our engine for moving the cage up and down in the liquid in the kettle; Fig. 2, an enlarged front elevation of our engine for lifting the cage; Fig. 3, a plan of Fig. 2, and Fig. 4, a plan of disk, Figs. 1 and 2, showing handle by means of which this disk and the parts connected thereto may be moved by hand.

A is an upright cylinder which is furnished at is upper end with a stuffing box B and within which is a piston C and a piston rod D which passes upward and out through the stuffing box B.

E, F, G, H are pipes the two former of which enter the upper part of the cylinder A, preferably at opposite sides as shown, and the two latter of which enter the cylinder, preferably upon opposite sides, at its bottom. Upon the pipes E, F, G, H are valves E′, F′, G′, H′ which control the flow of the steam or water to and from the cylinder A. In the drawings E′, G′ are the inlet valves and F′, H′ the exhaust valves.

Connected to the valves E′, F′, G′, H′ are levers E², F², G², H² and connecting the ends of levers E², F² is a link I and connecting the ends of levers G², H² is a link J.

K is an adjustable rod connecting the ends of levers E², G²; L, an adjustable rod connecting the ends of levers F², H². The rods K, L are made in two pieces the inner ends of which are threaded and which are connected by a sleeve nut M as shown.

Pivoted to the cylinder A is a disk N which carries rollers O, P the former adapted to strike and raise the link I to open the inlet valve E′ and close the exhaust valve F′, the latter to strike and lower the link J to open the inlet valve G′ and close the exhaust valve H′ or vice versa as hereinafter described.

R is a pin secured to disk N; S, a connecting rod carried by the upper end of piston rod D which is furnished with two hooks or catches S′, S², the former of which is adapted to engage pin R and move this pin downward when the piston rod has almost reached the end of its downward stroke, and the latter of which is adapted to engage and move this pin upward when the piston rod has almost reached the end of its upward stroke. To the upper end of the piston rod is attached one end of a cord or chain T, Fig. 1, which passes around pulleys U and has its other end attached to the cage V which carries the yarn to be dyed.

The machine being in the position shown in the drawings steam or water is admitted into the lower part of the cylinder A and raises the piston C and piston rod D which draws up connecting rod S, the hook S² upon the lower part of which presently engages pin R on disk N causing this disk to turn upon the pin N′ by means of which it is secured to cylinder A. The roller O now engages and lifts link I which throws over arms or levers E², F² opening the inlet valve E′ and closing the exhaust valve F′. Steam or water is now admitted to the upper part of cylinder A and forces the piston C and its connected parts downward until the hook S′ on connecting rod S strikes pin R and moves disk N around and causes roller P to strike and move down link J which, through arms G², H², closes the exhaust valve H′ and opens the inlet valve G′ when the movement of the parts is reversed as already described.

The roller P may be done away with if desired and the valves operated by the falling of the arms and levers connected to them when the pin R is struck by hook S′ and the roller O moved away from link I.

*a* is a slot in disk N; *b*, a pin carried by the cylinder A and passing through slot *a*. This pin and slot limit the movements of the disk N in either direction.

c, best shown in Fig. 4, is a handle by means of which the disk N may be operated by hand.

The device is preferably set so that during its operation the stroke of the piston C will be considerably shorter than the length of the cylinder A. When it is desired to remove the cage from the kettle the connecting rod S is moved out of operative contact with pin R and steam or water is admitted to the upper part of cylinder A and drives the piston down to the bottom of the cylinder and the cage is lifted clear of the kettle. The cage can now be moved away from the kettle and steam or water admitted to the bottom of the cylinder when the piston will rise and lower the cage to the floor, or to a truck upon which the cage and yarn may be carried away. The same effect may be produced, if the machine is worked at the full stroke of the cylinder A, by securing the cage V when it is in its highest position in the kettle, then raising the piston and piston rod to their highest position, shortening the cord or chain T, and then lowering the piston and piston rod which will lift the cage clear of the kettle.

In Fig. 1 d is a valve by means of which the flow of steam or water to the inlet valves E', G' may be controlled.

Having thus described our invention, we claim—

1. The combination of an upright cylinder, a piston and a piston rod within said cylinder, an inlet and an exhaust valve at the upper end of said cylinder, an inlet and an exhaust valve at the lower end of said cylinder, arms or levers connected to said valves, links connecting the ends of the levers on inlet and exhaust valves, adjustable rods connecting the levers on said inlet valves, adjustable rods connecting the levers on said exhaust valves, and means, operated by the movements of the piston rod, for alternately opening and closing said inlet and exhaust valves, all substantially as and for the purposes set forth.

2. The combination of an upright cylinder, a piston and a piston rod within said cylinder, an inlet and an exhaust valve at the upper end of said cylinder, an inlet and an exhaust valve at the lower end of said cylinder, arms or levers connected to said valves, links connecting the ends of said levers on said inlet and exhaust valves, adjustable rods connecting said levers on said exhaust valves, a disk pivoted to said cylinder and adapted to alternately engage the links connecting the inlet and exhaust valves, a pin on said disk, a connecting rod carried by said piston rod, and hooks on said connecting rod adapted to alternately engage said pin and to move said disk, all substantially as and for the purposes set forth.

3. The combination of an upright cylinder, a piston and a piston rod within said cylinder, an inlet and an exhaust valve at the upper end of said cylinder, arms or levers on said valves, a link connecting said arms or levers, an inlet and an exhaust valve at the lower end of said cylinder, arms or levers on said valves, a link connecting said arms or levers adjustable rods connecting said arms on said inlet valves, adjustable rods connecting said arms on said exhaust valves, a disk pivoted to said cylinder, a stop for limiting the movements of said disk, a pin on said disk, a handle formed by said pin, rollers carried by said disk adapted to engage links connecting said arms on said inlet and exhaust valves, a connecting rod carried by said piston rod, and hooks on said connecting rod adapted to alternately engage said pin on said disk, all substantially as and for the purposes set forth.

WILLIAM H. LORIMER.
JOHN W. BIRKEY.

Witnesses:
ROBERT CLARK,
JOHN F. SMITH.